(12) United States Patent
Hengel et al.

(10) Patent No.: US 7,527,705 B2
(45) Date of Patent: May 5, 2009

(54) METHOD FOR ROUTING ELECTRICAL CONDUCTOR BETWEEN PANELS

(75) Inventors: James F. Hengel, Romeo, MI (US); Pei-Chung Wang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/625,838

(22) Filed: Jan. 23, 2007

(65) Prior Publication Data
US 2008/0173397 A1    Jul. 24, 2008

(51) Int. Cl.
| | |
|---|---|
| B29C 65/00 | (2006.01) |
| B31B 1/60 | (2006.01) |
| B32B 37/00 | (2006.01) |
| B60J 7/00 | (2006.01) |
| B60K 37/00 | (2006.01) |
| B60N 2/00 | (2006.01) |
| B60N 3/00 | (2006.01) |
| B60R 13/07 | (2006.01) |
| B62D 25/06 | (2006.01) |
| B62D 25/07 | (2006.01) |
| B60L 1/00 | (2006.01) |
| B60L 3/00 | (2006.01) |
| H02G 3/00 | (2006.01) |
| H01R 33/00 | (2006.01) |

(52) U.S. Cl. ............ 156/304.1; 156/304.2; 296/193.05; 296/193.07; 296/203.01; 296/204; 296/210; 307/10.1; 439/34

(58) Field of Classification Search ............ 156/60, 156/293, 294, 304.1, 304.2; 296/193.02, 296/193.05, 193.06, 193.07, 203.01, 204, 296/210; 307/10.1; 439/34, 36
See application file for complete search history.

(56) References Cited

U.S. PATENT DOCUMENTS

| | | | |
|---|---|---|---|
| 6,402,155 B2 * | 6/2002 | Sakata | 277/314 |
| 2004/0169395 A1 * | 9/2004 | Chevli et al. | 296/146.5 |
| 2004/0211582 A1 * | 10/2004 | Stuart | 174/50 |

FOREIGN PATENT DOCUMENTS

| | | | |
|---|---|---|---|
| JP | 2004243987 A | * | 9/2004 |
| WO | WO 2004087826 A2 | * | 10/2004 |

OTHER PUBLICATIONS

Giles, Carl, & Giles, Barbara. Glue It! (1984). Tab Books. 1st ed. p. 69.*

* cited by examiner

*Primary Examiner*—Jeff H Aftergut
*Assistant Examiner*—Brian R Slawski

(57) ABSTRACT

A method is provided for routing electrical conductors through a vehicle body having first and second body panels with panel edges attached together. The method includes placing a bead of adhesive along the edge of the first body panel; placing the electrical conductor along the edge of the first body panel; placing an edge of a second body panel onto the bead of adhesive; and curing the adhesive so that the edges of the body panels are adhered together by an adhesive joint and the electrical conductor is embedded between the body panels within the adhesive joint.

6 Claims, 2 Drawing Sheets

METHOD FOR ROUTING ELECTRICAL CONDUCTOR BETWEEN PANELS

FIELD OF THE INVENTION

The present invention relates to a method for routing an electrical conductor within a vehicle body and more particularly to embedding the electrical conductor within an adhesive bond that attaches the vehicle body panels together.

BACKGROUND OF THE INVENTION

It is known that vehicle bodies are typically manufactured by attaching together a large number of body panels and mounting various components on the vehicle body. The vehicle body panels can be attached together by welding or bolting or by adhesive bonding.

It is also known to route electrical conductors between various switches, gauges, motors, lights and other components for supplying operating current as well as control signals. The electrical conductors can be individual insulated wires, bundles of wires, or flat foil conductors carried on a flexible plastic strip. The conductors are attached to the vehicle body by clips and fasteners and adhesive tapes. The conductors may be routed through protective conduits for protection against wear and short circuits. At those points where a conductor must pass through a hole from one side of a panel to the other side of the panel, a protective grommet is installed to protect the conductor against chafing and wear.

It would be desirable to provide a new and improved method for routing electrical conductors through a vehicle body in manner that would reduce the need for clips to hold the conductors in place and reduce the need for conduits and grommets for the protecting of the conductors from wear.

SUMMARY OF THE INVENTION

A method is provided for routing electrical conductors through a vehicle body having first and second body panels with panel edges attached together. The method includes placing a bead of adhesive along the edge of the first body panel; placing the electrical conductor along the edge of the first body panel; placing an edge of a second body panel onto the bead of adhesive; and curing the adhesive so that the edges of the body panels are adhered together by an adhesive joint and the electrical conductor is embedded between the body panels within the adhesive joint.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
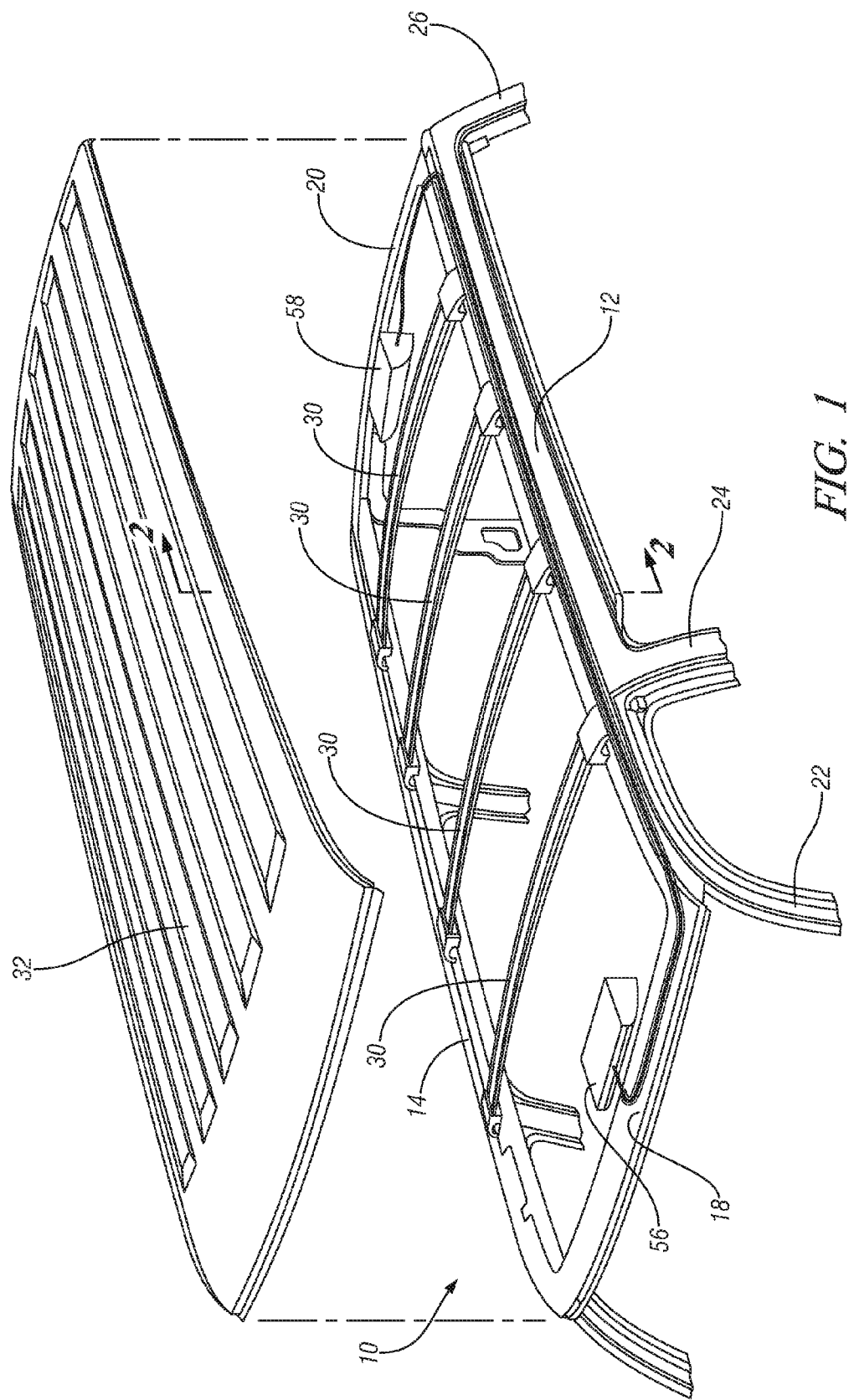
FIG. 1 is a perspective view of a vehicle body having an electrical conductor laid into an adhesive bead applied to the edge of a body side panel.
Figure 2:
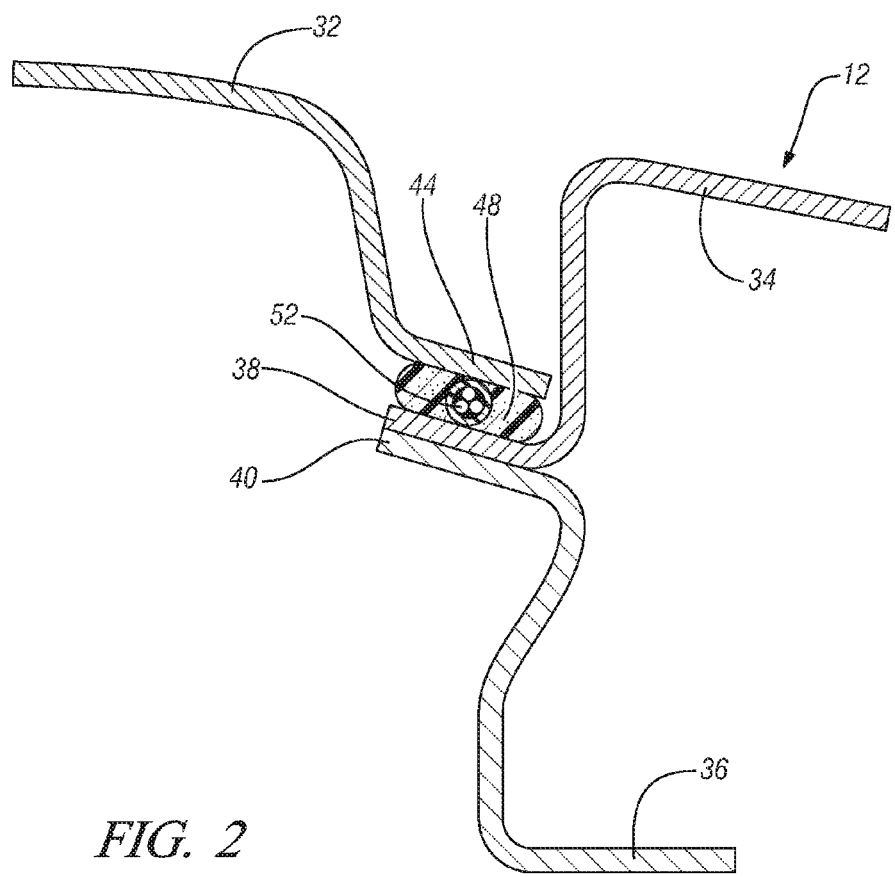
FIG. 2 is a section view taken in the direction of arrows 2-2 of FIG. 1.

Referring to FIGS. 1 and 2, vehicle body 10 includes vehicle body side structures 12 and 14 that are spaced apart by a front header 18 and a rear header 20 and supported by vertical extending pillars 22, 24 and 26. A number of roof bows 30 extend between the body side structures 12 and 14 for supporting a roof panel 32.

As seen in FIG. 2, the body side structure 12 includes a panel 34 and a panel 36 that have abutting flanges 38 and 40 that are spot welded together. The roof panel 32 has a flange 44 that is attached to the flange 38 of the body side structure by a bead of adhesive 48 that runs along the length of the flange 38. As seen in the drawing an electrical conductor 52 extends parallel with the flanges 38 and 44 and is embedded with the bead of adhesive 48 so that the electrical conductor 52 is concealed and protected within the adhesive joint and the need for clips or other wire anchoring attachments is obviated. As seen in FIG. 1, the electrical conductor 52 runs the length of the vehicle body from a switch console 56 near the driver, to an electrical appliance, such as a rear window defroster 58 at the rear of the vehicle.

Figure 3:
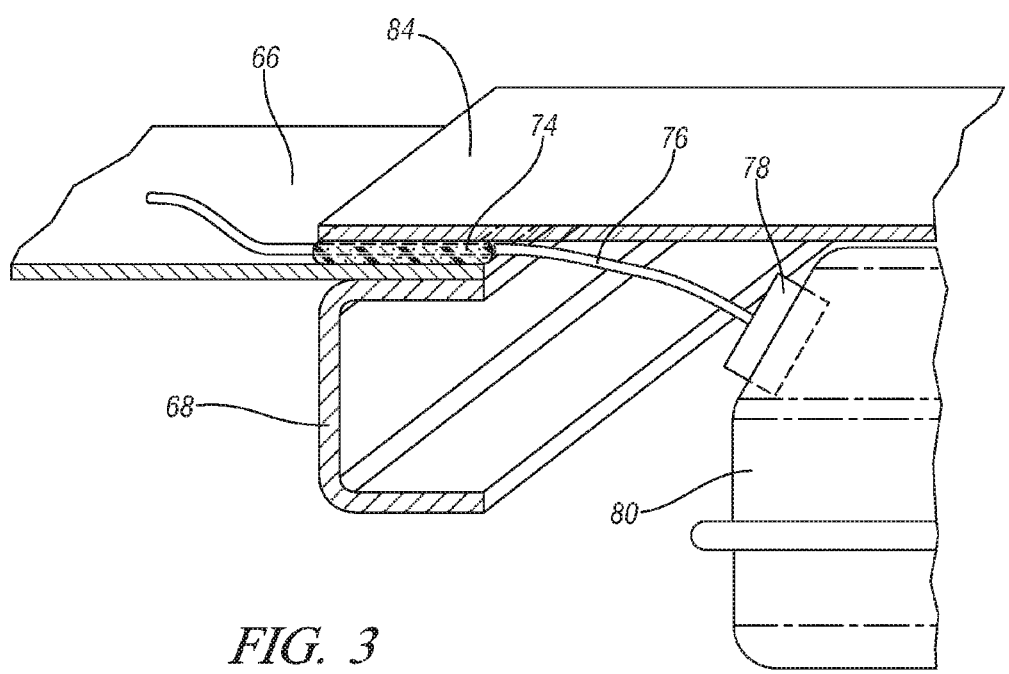
FIG. 3 is a perspective view of a vehicle body floor pan assembly having a conductor embedded into the adhesive joint between a pair of floor panels.

FIG. 3 shows another embodiment of the invention in which the vehicle body includes a front floor panel 66 that is attached to and supported by floor beam 68. A bead of curable adhesive 74 is dispensed along the edge of the front floor panel 66 in readiness for the installation of the rear floor panel 84. However, prior to installing the rear floor panel 84, an electrical conductor 76 is installed transversely across the adhesive bead 74 to extend in one direction toward the interior of the body and in the other direction toward the exterior of the vehicle body. The conductor 76 extends between a fuel pump module 78 of the fuel tank assembly 80, and the instrument panel and battery of the vehicle, not shown. In this way, the electrical conductor 76 is passed from the interior of the vehicle and above the vehicle floor, to beneath the vehicle floor and the vehicle exterior. The adhesive bead 74 anchors the electrical conductor 76 and also obviates to need to install a separate rubber grommet as is often used when an electrical conductor is conventionally routed through a hole in the vehicle body.

The foregoing description of the invention is exemplary in nature and, thus, variations thereof are intended to be within the scope of the invention. For example, the electrical conductor can be one or more individual insulated wires, or the electrical conductor can be a ribbon cable where flat foil conductors are carried on a strip of flexible plastic, or the conductor can be a bundle of wires. The order of assembling the panels, the adhesive and the wires can be varied. For example, the conductor can be laid on the panel and then the adhesive bead applied. Or the adhesive can be applied and then the conductor can be laid and pressed onto the adhesive bead. Or the adhesive can be applied to the electrical conductor and then the pre-applied electrical conductor and the adhesive can be laid onto the one panel in readiness to receive the other panel atop the combined adhesive bead and electrical conductor. Furthermore, if the conductor has no insulation, the adhesive can act as insulation.

In FIG. 2, it is seen that the electrical conductor 52 engages with the flange 38 and the flange 44 so as to serve as a spacer to define the height of the roof panel flange 44 above the flange 38 and define the thickness of the bead of adhesive 48. Thus the diameter of the insulation on the electrical conductor 52 can be tailored to provide that thickness of the bead of adhesive 48 that is desired to obtain the requisite adhesive bond strength between the flange 38 and the flange 44. If the diameter of the electrical conductor 52 exceeds the desired thickness of the bead of adhesive 48, then a groove can be formed in the flange 38 and/or the flange 40 to accept the extra dimension of the electrical conductor 52. In other applications it may be desirable to use spacers or other techniques to establish the thickness of the bead of adhesive.

What is claimed is:

1. In a vehicle body having vehicle body panel assembly assembled of two panels and having an interior side and an exterior side, a method of routing an electrical conductor through the body panel assembly from the interior side to the exterior side of the panel assembly, comprising;
    providing first and second body panels having generally planar flanges along the edge thereof;
    placing a bead of adhesive upon the planar flange at the edge of the first body panel;
    placing the electrical conductor transversely across the planar flange at the edge of the first body panel so that the electrical conductor extends from the adhesive bead in one direction atop the planar flange at the edge of the first body panel and in the other direction beyond the edge of the first body panel;
    placing the planar flange of the edge of a second body panel onto the bead of adhesive;
    and curing the adhesive so that the body panels are adhered together by an adhesive joint to form the body panel assembly, and the electrical conductor is embedded between the planar flanges at the edge of the body panels within the adhesive joint and thereby extends between the interior side of the panel assembly and the exterior side of the panel assembly.

2. The method of claim 1 further comprising applying the adhesive first to the edge of the first body panel and then subsequently placing the electrical conductor onto the adhesive.

3. The method of claim 1 further comprising first placing the electrical conductor onto the edge of the first panel and then subsequently placing the adhesive onto the First edge and the electrical conductor.

4. The method of claim 1 further comprising the adhesive being first placed onto the conductor and then the conductor and the adhesive are simultaneously placed upon the edge of the first panel.

5. The method of claim 1 further comprising the electrical conductor being a bare uninsulated conductor and the adhesive acts to insulate the bare conductor from the panels without the need for a grommet.

6. The method of claim 1 further comprising the electrical conductor being an insulated conductor and the adhesive acts to protect the insulation from wearing on the body panels.

* * * * *